(12) United States Patent
Daughtry et al.

(10) Patent No.: US 8,024,361 B2
(45) Date of Patent: Sep. 20, 2011

(54) METHOD AND SYSTEM FOR ALLOWING MULTIPLE USERS TO ACCESS AND UNLOCK SHARED ELECTRONIC DOCUMENTS IN A COMPUTER SYSTEM

(75) Inventors: Chenita D. Daughtry, Roxbury, MA (US); Carol S. Zimmet, Boxboro, MA (US); Robert C. Weir, Westford, MA (US); Mohamed Bachiri, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/876,866

(22) Filed: Oct. 23, 2007

(65) Prior Publication Data

US 2009/0106247 A1     Apr. 23, 2009

(51) Int. Cl.
*G06F 7/00* (2006.01)
(52) U.S. Cl. ........................... 707/786; 715/759
(58) Field of Classification Search .................. None
See application file for complete search history.

(56) References Cited

U.S. PATENT DOCUMENTS

| | | | | |
|---|---|---|---|---|
| 5,706,510 | A * | 1/1998 | Burgoon | 707/203 |
| 6,067,551 | A * | 5/2000 | Brown et al. | 707/203 |
| 6,347,312 | B1 * | 2/2002 | Byrne et al. | 707/3 |
| 2002/0065848 | A1 * | 5/2002 | Walker et al. | 707/511 |
| 2002/0162053 | A1 * | 10/2002 | Os | 714/38 |
| 2002/0184535 | A1 * | 12/2002 | Moaven et al. | 713/202 |
| 2002/0188729 | A1 * | 12/2002 | Zhou et al. | 709/227 |
| 2005/0228807 | A1 * | 10/2005 | McCauley et al. | 707/100 |
| 2006/0089938 | A1 * | 4/2006 | Leonard et al. | 707/100 |
| 2006/0101081 | A1 * | 5/2006 | Lin et al. | 707/200 |
| 2006/0112100 | A1 * | 5/2006 | Maeda et al. | 707/8 |
| 2006/0136926 | A1 * | 6/2006 | Goldick | 718/104 |
| 2006/0155705 | A1 * | 7/2006 | Kamper et al. | 707/8 |
| 2007/0156706 | A1 * | 7/2007 | Hayes | 707/10 |
| 2007/0185872 | A1 * | 8/2007 | Ho et al. | 707/8 |
| 2007/0233689 | A1 * | 10/2007 | Carpenter et al. | 707/9 |
| 2008/0148369 | A1 * | 6/2008 | Aaron | 726/5 |
| 2008/0195615 | A1 * | 8/2008 | Rowley | 707/8 |
| 2009/0063488 | A1 * | 3/2009 | Daum et al. | 707/8 |

OTHER PUBLICATIONS

Lewis, B. T. et al., "Shared Books: Collaborative Publication management for an Office Information System", Conference on Supporting Group Work archive Proceedings of the ACM SIGOIS and IEEECS TC-OA 1988 conference on Office information systems, Palo Alto, CA, ACM SIGOIS Bulletin, vol. 9, Issue 2-4, Apr. & Jul. 1988, pp. 197-204.*

* cited by examiner

*Primary Examiner* — Vei-Chung Liang
(74) *Attorney, Agent, or Firm* — David A. Dagg

(57) ABSTRACT

A system for allowing multiple users to access and unlock shared electronic documents in a computer system. A group of users are defined as potential "lock-breaker" users for a document, such that they are automatically contacted in the event that a user wishes to unlock the document after it has been locked by another user. The lock-breaker users defined for a document are given access rights to the document that allow them to break a current lock on the document, so that it can be opened for editing, and accordingly re-locked. The lock-breaker users for a document may be organized in a hierarchy, such as a hierarchy matching the relationships of employees of an organization. The lock-breaker hierarchy may define the order in which the lock-breaker users are automatically contacted when a user wishes to access a locked document (e.g. an LDAP directory tree or social network).

14 Claims, 5 Drawing Sheets

Unlock Group Definition User Interface Object 100

UNLOCK GROUP FOR SHARED DOCUMENT EDITING SESSION

Please indicate the other users that will be able to unlock the shared document after you have locked it.

Users or Groups
(in order to be
contacted):

102

Should all members of the Unlock Group be contacted immediately to process an unlock request?   Yes___   No___ ← 104
(otherwise contacting will be in the contact order you specified above)

Please indicate an inactivity time period for the lock check notifications
to be sent to you while you have the document locked.

Lock Check Inactivity Time
Period:

106

CANCEL    OK

*FIG. 2*

METHOD AND SYSTEM FOR ALLOWING MULTIPLE USERS TO ACCESS AND UNLOCK SHARED ELECTRONIC DOCUMENTS IN A COMPUTER SYSTEM

FIELD OF THE INVENTION

The disclosed system relates generally to systems for controlling access to electronic documents and programs, and more specifically to a method and system for allowing multiple users to access and unlock electronic documents.

BACKGROUND OF THE INVENTION

Document locking is the process of keeping a user from editing an electronic document while another user is editing the same document. Many existing systems provide some type of document locking in order to prevent users from simultaneously modifying a shared document. In the present discussion, the term "document" refers to any specific type of electronic document or file stored in a computer readable memory, and accessible by users through one or more executing computer programs, such as application programs, operating system programs, and/or other specific program types (e.g. through a graphical user interface or the like). A document may contain text, graphics, program code, or any other specific type of document content.

In typical existing systems that allow only one user to have write access to a document at any given time, the user that is currently editing a document is the only user that can unlock the document (e.g. by closing it) so that other users can access it. This may cause problems in a situation in which multiple users share responsibility for developing a document, since whenever one of those users has locked the document to obtain write access to it, the other users sharing the document have to depend on that single user to unlock the document so that they can later access it.

For example, a problem may arise if user A locks a document (e.g. by opening a local copy for editing), and then goes home for the evening without unlocking it. Under these circumstances, user B is unable to unlock the document to work on it that evening. User B can either wait until user A comes back to the office and unlocks the document the next day, or attempt to contact user A (e.g. by phone or e-mail) to request that the document be immediately unlocked. If user B wants to work on the document prior to user A returning to the office, and user A is not reachable, then user B may be prevented from working, causing a bottleneck in the document development process and resulting in wasted time.

Some existing systems have provided an administrative or super user account that allows access by an administrative user to all other accounts or documents. However, this type of solution simply defers the problem to an equivalent problem, namely finding the administrator user with the credentials to access the administrative account. In addition, the administrative user is unlikely to be aware of the context or importance of relative claims by different users regarding the necessity of breaking an existing lock and/or establishing a new lock on a document, and may be unable to make the business determination as to whether a request to break a lock should be granted. While these types of existing solutions provide a way to break an existing lock, they do not facilitate a correct and prompt business decision as to whether to break a lock by quickly and automatically communicating the issue to one or more appropriate people.

SUMMARY OF THE INVENTION

To address the above described and other shortcomings of previous systems, a new method and system are disclosed for allowing multiple users to access and unlock shared electronic documents in a computer system. In the disclosed system, an "unlock" group of users are defined as potential "lock-breaker" users for a document, such that they are automatically contacted in the event that a user wishes to unlock the document after it has been locked by another user. The unlock users defined for a document are given access rights to the document that allow them to break a current lock on the document, so that it can be opened for editing, and accordingly re-locked. The unlock group of users for a document may be organized in a hierarchy, such as a hierarchy matching the relationships of employees of an organization. The unlock group hierarchy may define the order in which the lock-breaker users are automatically contacted when a user wishes to access a locked document. One example of such a hierarchy is a Lightweight Directory Access Protocol (LDAP) directory tree.

The unlock users for a document may either be defined at the time the document is created, and then maintained asynchronously with regard to document accessing and/or locking. Alternatively, the disclosed system may be embodied such that the group of unlock users can be defined each time the document is locked, by the user locking the document. In such an embodiment, a user opening a shared document is provided with a user interface component (e.g. dialog box or the like) that allows the user to indicate (e.g. by way of user names, e-mail addresses, etc.), the users to be included in the unlock group for the specific document for the specific locking that he or she is performing on the document at that time. Further in such an embodiment, the locking user may be provided with the option of indicating a predefined user hierarchy (e.g. an LDAP directory) that is to be used as the unlock user group for the document that he or she is putting the lock on at that time.

Use of a user hierarchy such as an LDAP directory for the unlock user group enables managers to have the ability to unlock a document that is locked by an employee that is located below them in the LDAP directory tree. Other examples of pre-defined user groups that could be indicated as the unlock users for a document being locked include a social network related to the user locking the document or the document being locked. For example, social networks used for this purpose may be made up of or include the set of users assigned to a project or team, the set of users that have previously edited the document, the set of users that are owners of documents contained in the same folder or directory as the document being locked, the set of users that are employees of a given company, etc.

Further during operation of an embodiment of the disclosed system, users defined within the unlock group for a document may be sent notifications of their being included in the unlock group, and presented with user interface options from which they may select either accepting or declining being included in the group. Once a user has accepted their being included in the unlock user group, the user would be given access privileges for the document that allow them to unlock the document when it is locked by another user.

When an unlock request is generated, users within the unlock group would be automatically notified (e.g. by pop-up window, e-mail, instant message, automated telephone call, etc.). In one embodiment, an automatic electronic notification includes an indication of the time that the document has been locked, and the identity of the user currently holding the lock (e.g. including user identifier or name, and/or contact information for that user such as e-mail address, instant messaging screen name, telephone number, etc.). A change history for the document may further be accessible to a user in the unlock group, for example by being included in the electronic notification of the lock break request.

In another embodiment of the disclosed system, a timer is started at the time a document is locked (e.g. opened). The locking user is then periodically prompted or sent an electronic notification to inquire whether the user is still editing the document, and/or automatically sent an electronic reminder via instant messaging or other means at log-off or shut-down time to prevent the user from leaving while the document is still locked.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a simplified screen shot showing a portion of a user interface created by an embodiment of the disclosed system to input the identities of an unlock user group for a document that is being locked, e.g. for an editing session;

DETAILED DESCRIPTION OF EXEMPLARY EMBODIMENTS

Figure 1:
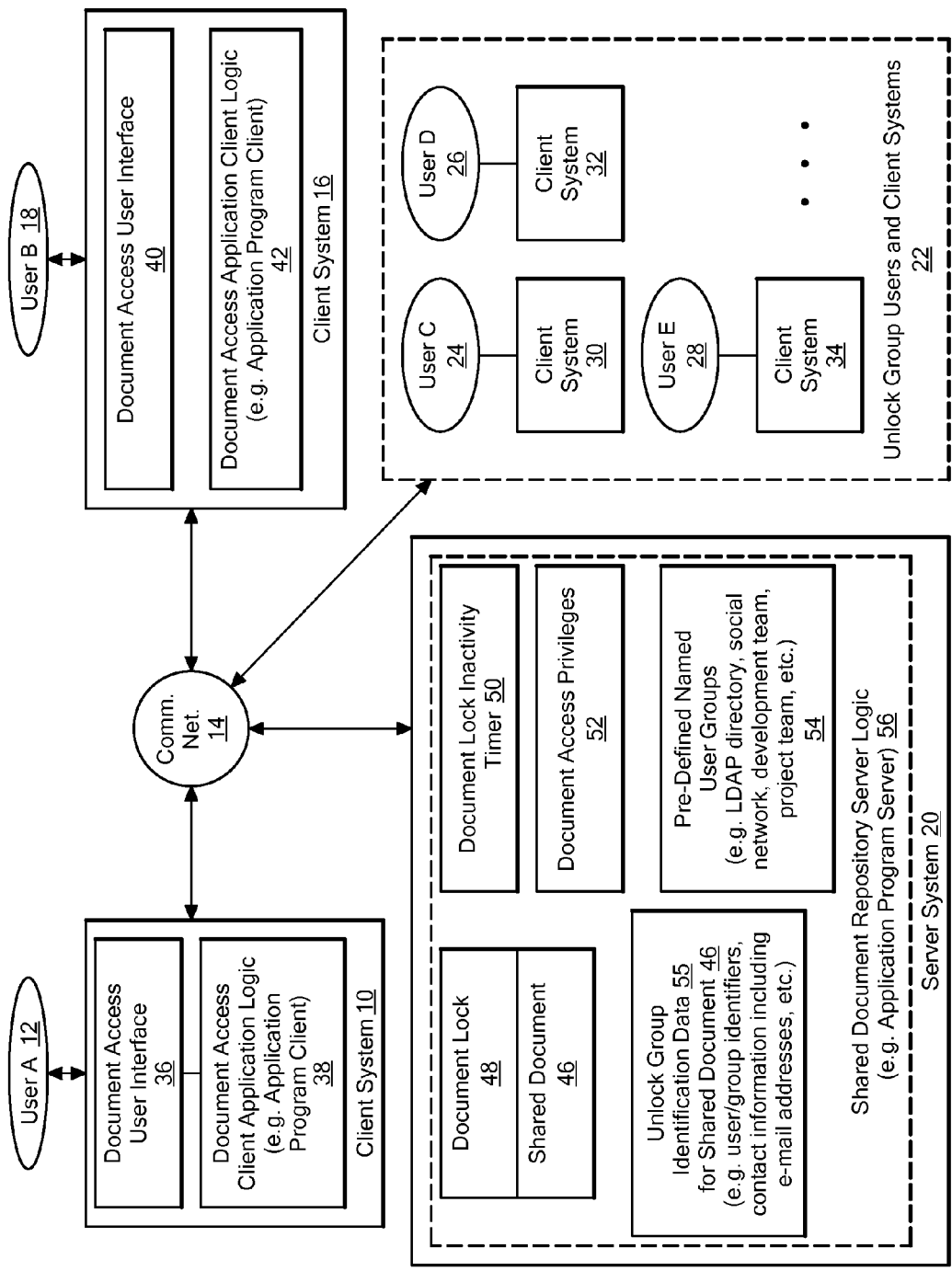
FIG. 1 is a block diagram of hardware and/or software components in an illustrative embodiment of the disclosed system.

FIG. 1 is a block diagram of hardware and/or software components in an illustrative embodiment of the disclosed system. As shown in FIG. 1, Client System 10 includes Document Access Client Application Logic that operates to generate Document Access User Interface 36 to User A 12. For example, the Document Access Client Application Logic 38 may be any specific type of application program client module executing on the Client System 10, such as a document editing application or the like.

A Server System 20 in the example of FIG. 1 includes Shared Document Repository Server Logic 56 that facilitates sharing of Shared Document 46 among multiple physically disbursed users, including for purposes of illustration User A 12 and User B 18. The Shared Document 46 may further be shared with those users that belong to an unlock group for the document, shown in FIG. 1 as User C 24, User D 26, User E 28, etc. The Shared Document Repository Server Logic 56 may be any specific type of application program server module executing on the Server System 20, such as a document database or the like. The Shared Document Repository Server Logic 56 further includes a Document Lock 48. When in a "SET" state, the Document Lock 48 allows only the user that set it to write to or otherwise modify the Shared Document 46. In one embodiment, while the lock is set, other users sharing the Shared Document 46 (i.e. those sharing users that did not set the lock), may only obtain read-only copies of the Shared Document 46 until it is unlocked (i.e. the lock state is "CLEAR"). A user locks Shared Document 46 by requesting a modifiable copy of the document, which is loaded onto the locking user's local computer system. For example, when User A 12 opens an editing session on the Shared Document 46 using Document Access Client Application Logic 38, the Shared Document 46 is locked, i.e. the state of Document Lock 48 becomes "SET". A local copy of Shared Document 46 is then loaded onto Client System 10, and User A 12 edits the local copy through the Document Access User Interface 36. When User A 12 is done editing the local copy, User A 12 closes the document through the Document Access User Interface 36, the modified version of the document is written back to Server System 20, and Shared Document 46 is unlocked (i.e. the lock state changed to "CLEAR"). As described further below, the disclosed system operates such that while the Document Lock 48 is set, other users sharing Shared Document 46 (e.g. User B 18) can trigger automatic requests for the document to be unlocked by a user other than User A 12 (e.g. users in an unlock group for Shared Document 46 illustrated by User C 24, User D 26, User E 28, etc). For example, in the disclosed system, a request to open Shared Document 46 by User B 18 through a Document Access User Interface 40 generated by Document Access Application Client Logic 42 on Client System 16 (e.g. a request to edit the Shared Document 46), while Shared Document 46 is locked by User A 12, may result in an electronic request to unlock Shared Document 46 being sent to one or more members of the unlock user group (e.g. one or more of User C 24, User D 26, User E 28, etc., shown having associated client systems 30, 32, 34 etc., within the Unlock Group Users and Client Systems 22 of FIG. 1).

Further as shown in the illustrative embodiment of FIG. 1, the Shared Document Repository Server Logic 56 includes Unlock Group Identification Data 55 for Shared Document 46. The Unlock Group Identification Data 55 includes identifiers for users and/or groups contained within the unlock group for the Shared Document 46, as well as contact information for users within the unlock group, such e-mail addresses, screen names, telephone numbers, etc. The contents of the Unlock Group Identification Data 55 may, for example, be defined by the user setting the lock on the Shared Document 46 at the time the lock is set for a given editing session. In such an embodiment, the unlock group information contained in the Unlock Group Identification Data 55 may be changed each time the Shared Document 46 is locked (e.g. opened for editing).

The Document Access Privileges 52 define the access privileges of users that share the Shared Document 46 (e.g. read, write, modify, delete, etc.), and further indicate that those users currently contained in the unlock group for Shared Document 46 have a special privilege (e.g. an "unlock" privilege) that gives them the ability to unlock Shared Document 46 when it is locked by another user. In one embodiment, the Document Access Privileges 52 are modified to allow a given user to unlock Shared Document 46 even when it is locked by another user when that user has been indicated as a member of the unlock group by a user that is locking Shared Document 46, in the event that they have expressly indicated that they accept being included in the unlock group.

Pre-Defined Named User Groups 54 stores definitions and/or names of user groups that may be selected (e.g. by the locking user) as part of the unlock group for Shared Document 46. Such user groups may, for example, one or more LDAP directories of users in a business organization, social networks of users, development teams, project teams, and/or other specific types of user groups. For example, a social network consisting of those users that have previously locked Shared Document 46 may be included as a pre-defined group in the Pre-Defined Named User Groups 54. Similarly, a social network consisting of those users that have previously accessed Shared Document 46 in any way may be included in the Pre-Defined Named User Groups 54. Such social networks may, for example, be determined and defined automatically by the Shared Document Repository Server Logic 56, e.g. by monitoring user accesses to the Shared Document 46.

A Document Lock Inactivity Timer 50 in the Shared Document Repository Server Logic 56 controls the inactivity time period with regard to the Shared Document 46 such that when Shared Document 46 is locked, but the user that locked Shared Document 46 is inactive for the inactivity time period defined by Document Lock Inactivity Timer 50, an electronic prompt is generated to the locking user to determine if they are currently active. In one embodiment, if the user that has locked Shared Document 46 has not confirmed that they are currently using the Shared Document 46 after expiration of the Document Lock Inactivity Timer 50, and another user subsequently issues a request to edit the Shared Document 46, then the disclosed system immediately starts sending one or more unlock requests to the users in the unlock group for the Shared Document 46. In another embodiment, when another user issues a request to edit the Shared Document 46, the message inquiring whether the user that locked the Shared Document 46 is sent to that user, and the Document Lock Inactivity Timer 50 is started. If the Document Lock Inactivity Timer 50 then expires without the user that locked Shared Document 46 either actively using the Shared Document 46 and/or expressly confirming that they are still using the Shared Document 46, then the disclosed system starts sending one or more unlock requests to the users in the unlock group for the Shared Document 46. Alternatively, upon expiration of the Document Lock Inactivity Timer 50 without the user that locked the Shared Document 46 (e.g. User A 12) accessing Shared Document 46, a user interface object is generated for another user (e.g. User B 18) that has requested access to Shared Document 46 (e.g. through Document Access User Interface 40) that enables the other user to cause one or more unlock requests to be sent to members of the unlock group for Shared Document 46.

In another embodiment of the disclosed system, a reminder (e.g. pop-up window or the like, instant message, e-mail message, etc.) is automatically generated to a user that has locked Shared Document 46 (e.g. User A 12) in response to detecting that the user has started to shut down their local computer system (e.g. Client System 10), or shut down or log off from the application through which they are editing Shared Document 46 (e.g. Document Access Client Application Logic 38), without unlocking Shared Document 46. The reminder indicates that Shared Document 46 is still locked, thus providing the locking user an opportunity to unlock Shared Document 46 before they shut down or log off, and accordingly preventing the user from leaving while the document is still locked.

The Client Systems 10, 16, 30, 32 and 34 of FIG. 1 may be any specific type of a computer system or intelligent electronic device, such as a desktop, laptop, or palmtop computer system, or a personal digital assistant, cell phone, or other electronic device. The Client Systems 10, 16, 30, 32 and 34 of FIG. 1 may include or control a display device capable of displaying a graphical user interface (e.g. including the Document Access User Interfaces 36 and 40) to a local user (e.g. User A 12, User B 18, User C 24, User D 26, User E 28, etc), such as a liquid crystal display (LCD), cathode ray tube (CRT), interferometric modulator display (IMOD), light emitting diode (LED), or the like.

Those skilled in the art will recognize that the Document Access Client Application Logic 38 and 42, and/or Shared Document Repository Server Logic 56 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 10, 16, 30, 32 and 34, and Server System 20 of FIG. 1 may include one or more processors, and program storage, such as memory, for storing program code executable on such processors, as well as input/output devices and/or interfaces. In the example of FIG. 1, the Client Systems 10, 16, 30, 32 and 34, and Server System 20 are interconnected through a computer or data Communication Network 14 (e.g. the Internet, a Local Area Network, etc.) through one or more of such input/output devices or interfaces, and through which may further be provided communication to a number of other client systems and/or other server systems.

FIG. 2 is a simplified screen shot showing a portion of a user interface created by an embodiment of the disclosed system to input the identities of a lock breaking user group for a document that is being locked. As shown in FIG. 2, an Unlock Group Definition User Interface Object 100 includes a Unlock Group User Identification field 102, into which a local user can input the user names and/or group names that identify the unlock group for a shared document that the local user is locking (e.g. has started editing). The local user may identify the members of the unlock group in the field 102 through various specific types of identifiers, such as user names, e-mail addresses, instant messaging screen names, etc. A prompt 104 enables the local user to indicate whether members of the unlock group should be contacted one at a time, or all at once. An inactivity timer input field 106 enables the local user to define a time period for a lock check inactivity timer (e.g. the Document Lock Inactivity Timer 50 of FIG. 1).

For example, the Unlock Group Definition User Interface Object 100 is generated by the disclosed system within the Document Access User Interface 36 in response to User A 12 initiating an editing session on the Shared Document 46. The contents of field 102 are stored in the Unlock Group Identification Data 55, and the time period entered into field 106 is used to set the time period for Document Lock Inactivity Timer 50. If a group name is entered into the field 102, that name's definition (e.g. the identities and/or contact information) for users in the group identified by the group name is automatically obtained from the Pre-Defined Named User Groups 54.

Figure 3:
FIG. 3 is a simplified screen shot showing a portion of user interface created by an embodiment of the disclosed system by an automatically generated electronic notification sent to an identified member of an unlock user group to obtain an indication of whether the notified user accepts or declines being a member of the unlock user group.

FIG. 3 is a simplified screen shot showing a portion of user interface created by an embodiment of the disclosed system by an automatically generated electronic notification sent to an identified member of a lock breaking user group to obtain an indication of whether the notified user accepts or declines being a member of the lock breaking user group. As shown in FIG. 3, an Unlock Group Member Notification User Interface Object 120 includes a prompt 122 enabling a local user to indicate whether they accept membership in an unlock group. For example, the Unlock Group Membership Notification User Interface Object 120 would be automatically generated in user interfaces for users that were indicated in the field 102 of FIG. 2. In the event that a given user checks the "Yes"

option, that user would be given "unlock" privileges in the Document Access Privileges 52 with respect to the Shared Document 46, as shown of FIG. 1. In an embodiment in which the unlock user group is re-defined each time the Document Lock 48 is set (e.g. for each editing session), the unlock privileges given to unlock group members are removed from the Document Access Privileges 52 in response to the shared document being unlocked (e.g. closed by the user performing the editing session).

Figure 4:
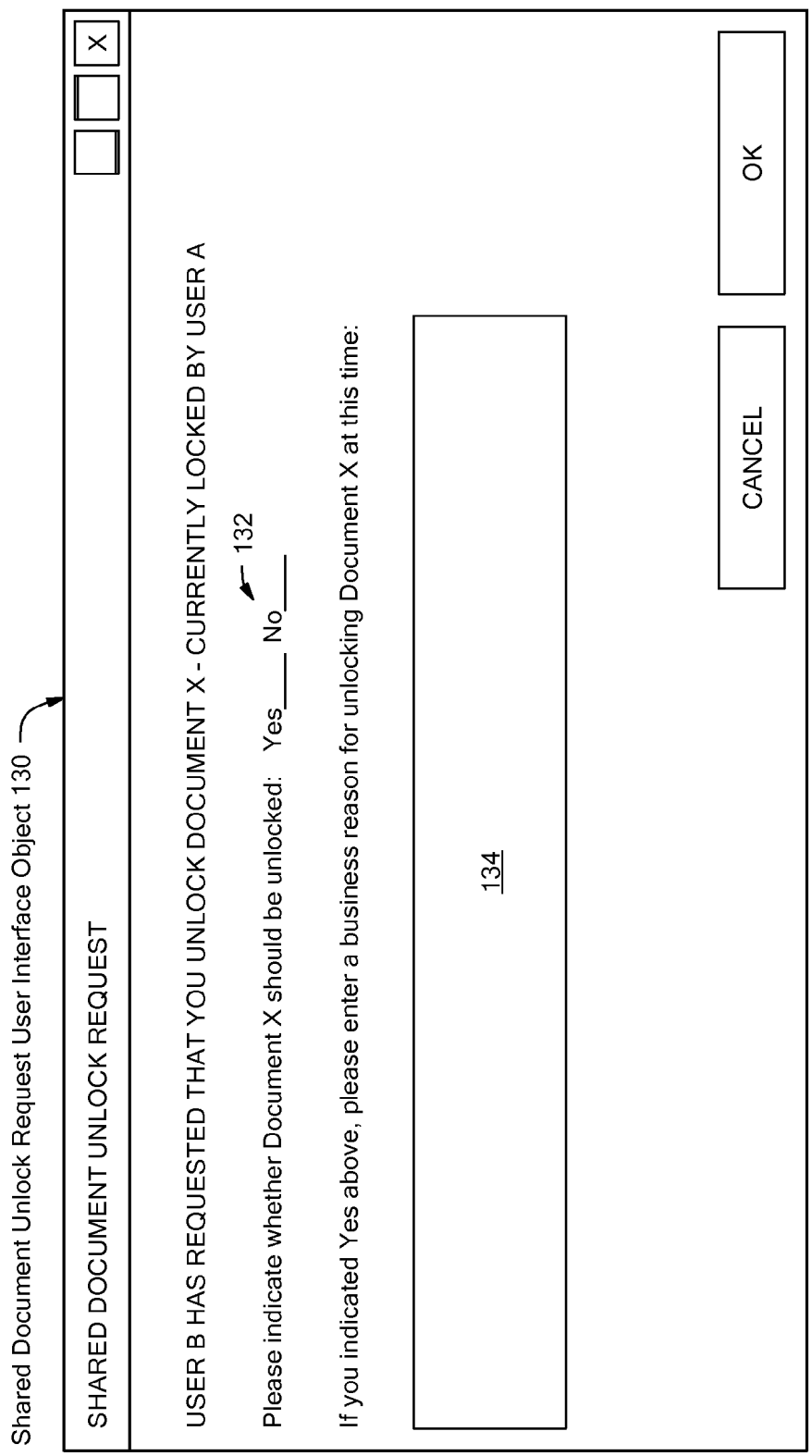
FIG. 4 is a simplified screen shot showing a user interface display created by an embodiment of the disclosed system by an automatically generated electronic request message that requests that a locked message be unlocked.

FIG. 4 is a simplified screen shot showing a user interface display created by an embodiment of the disclosed system by an automatically generated electronic request message that requests that a locked message be unlocked. A Shared Document Unlock Request User Interface Object 130 includes a prompt 132 that enables a local user that is a member of an unlock group for a shared document to unlock that document when it is currently locked by another user. A Business Reason field 134 enables the local user to input a business reason for unlocking the shared document in the event that the "Yes" option is checked in the prompt 132. The Shared Document Unlock Request User Interface Object 130 is automatically presented in the user interfaces of members of an unlock group for a currently locked shared document in response to a request to access the locked document from a user other than the user that has currently locked the document.

While pop-up window user interface display objects are shown for purposes of illustration in FIGS. 2-4, those skilled in the art will recognize that the present invention is not so limited. Accordingly, user interface objects for received e-mail messages, received instant messages, etc., may be provided in the alternative to convey the information displayed in, and to receive the user indicates inputted through, the illustrative user interface display objects of FIGS. 2-4.

Figure 5:
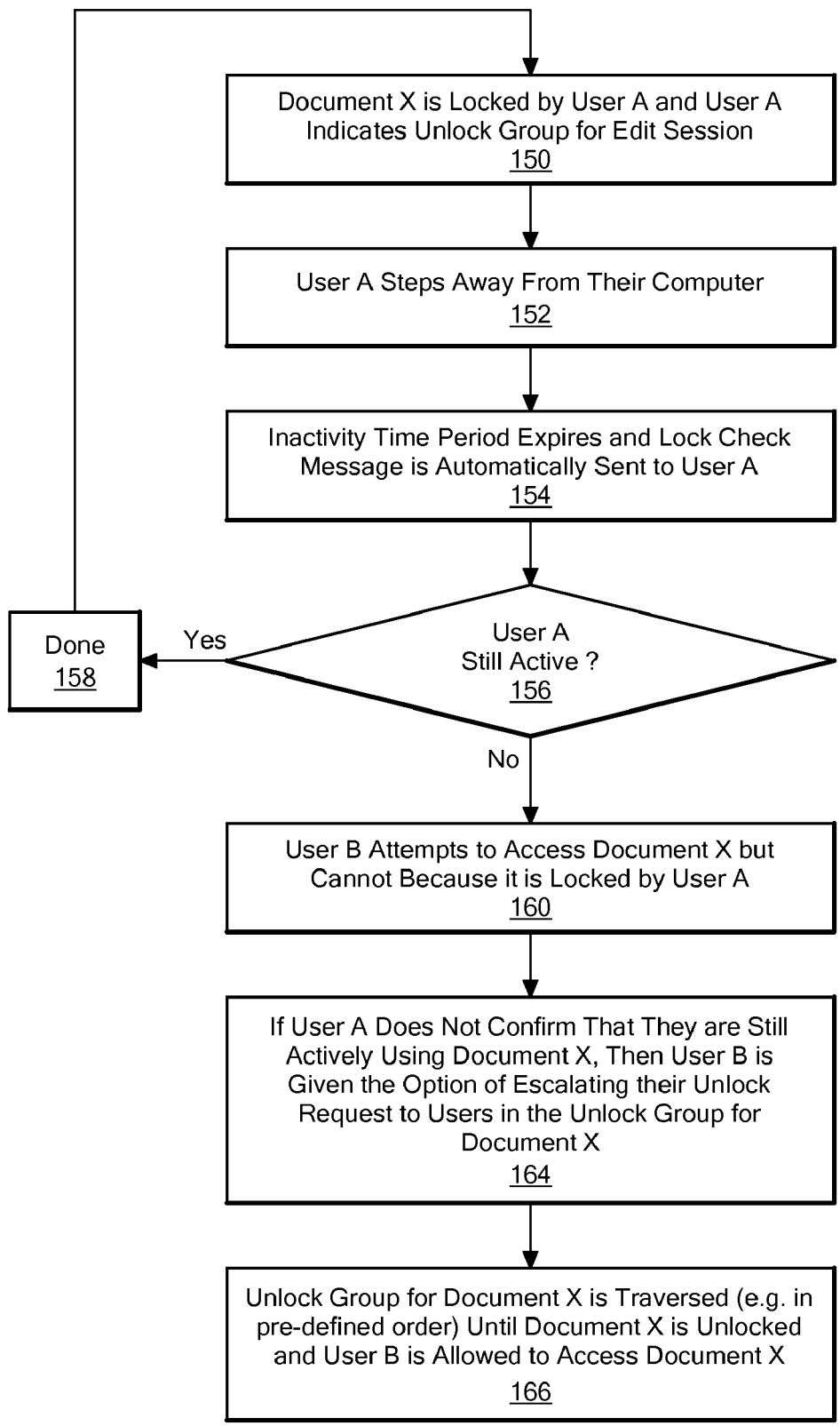
FIG. 5 is a flow chart showing steps performed during operation of an illustrative embodiment of the disclosed system.

FIG. 5 is a flow chart showing steps performed during operation of an illustrative embodiment of the disclosed system. At step 150, a shared electronic Document X is locked by User A (e.g. when User A begins editing Document X), and User A indicates a number of parameters relevant to locking Document X for the editing session, including the identities of the members of the unlock group for the editing session, the inactivity time period, whether all unlock groups are to be contacted at once, etc. At step 152, User A steps away from their computer system while Document X remains locked.

In a first embodiment, at step 154 the inactivity time expires and a lock check message (e.g. e-mail message, instant message, etc.) is sent to User A. If User A indicates they are still active at step 156 (e.g. by clicking on a button in a pop-up window, replying to an e-mail message, sending an instant message, etc.), then at step 158 the disclosed system is done, and the inactivity timer is reset, and the process returns to step 150. Steps 150, 152, 154, and 156 cycle continuously until the lock holding user is determined to be inactive for the inactivity time period and the lock holding user fails to respond to the lock check message automatically generated at step 154.

Otherwise, in the event that no response to the lock check message is received from the lock holding user at step 156, step 156 is followed by step 160. If at step 160 User B attempts to access (e.g. edit) Document X, and User A has not yet unlocked the document, and User A has not confirmed that they are still actively using Document X, then at step 164 the disclosed system operates to begin sending unlock requests to the users in the unlock group. In one embodiment, User B is also be required to expressly request that the unlock requests be sent to the members of the unlock group at step 164 (e.g. by clicking on a user interface button, etc.). At step 166, the unlock group for Document X is traversed in a pre-defined order until Document X is unlocked to allow User B to access Document X. For example, where the unlock group consists of an LDAP directory, at step 166 the LDAP directory is traversed upwards, such that persons at progressively higher levels of the LDAP directory are sent unlock request messages until Document X is unlocked for User B.

In an alternative embodiment, the inactivity timer is triggered when User B attempts to access Document X at a time when User A has locked Document X. In such an alternative embodiment, if User A is inactive for the duration of the inactivity timer after User B attempts to access Document X, and then does not expressly confirm that they are still using Document X after expiration of the inactivity timer without having accessed Document X, the disclosed system then operates as described above for steps 164 and 166, sending unlock request messages to members of the unlock group so that Document X can be unlocked to allow User B to access it.

In another alternative embodiment, in which the inactivity timer is triggered when User B requests access to Document X while Document X is locked by User A, and then the inactivity timer expires without User A having accessed Document X, no confirmation of activity is requested from User A, and steps 164 and 166 are performed directly in response to the inactivity timer expiring after User B's request to access Document X.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of automatically identifying and notifying an appropriate user to unlock a currently locked shared electronic document in a computer system, comprising:
   locking said electronic document in response to a first request to edit said shared electronic document, said first request from a first user;
   in response to said first request to edit shared document, generating an unlock group definition user interface object through which said first user defines an unlock group and an unlock group hierarchy;
   wherein said unlock group includes a plurality of members, wherein each member in said unlock group is a user having access rights allowing them to unlock said electronic document when said electronic document is locked by another user;
   wherein said unlock group hierarchy defines an order in which said members of said unlock group are automatically contacted to unlock said electronic document;
   receiving, prior to said first user unlocking said shared electronic document, a second request to edit said shared electronic document, wherein said second request to edit said shared electronic document is received from a second user; and
   in response to said second request to edit said shared electronic document, sending unlock requests to individual members of said unlock group in said order defined by said unlock group hierarchy until one of said unlock group members unlocks said shared electronic document.

2. The method of claim 1, further comprising:
   wherein said unlock group and unlock group hierarchy are re-defined each time said shared electronic document is locked.

3. The method of claim 2, further comprising allocating said access rights to said members in of said unlock group allowing said members of said unlock group to unlock said shared electronic document in response to said definition of said unlock group by said first user through said unlock group definition user interface object.

4. The method of claim 2, further comprising;
   generating for each member of said unlock group indicated by said first user a membership acceptance user interface component operable to input an indication that said member accepts membership in said unlock group.

5. The method of claim 2, further comprising:
   wherein said unlock group definition user interface further inputs an inactivity time period from said first user;
   detecting that said first user has not performed an action with regard to said shared electronic document within said inactivity time period; and
   automatically generating and sending a lock check message to said first user in response to said detecting that said first user has not performed an action with regard to said shared electronic document within said inactivity time period.

6. The method of claim 5, wherein said lock check message provides a user interface object through which said first user can indicate that said first user is currently active.

7. The method of claim 6, further comprising:
   automatically generating and sending said lock check message to said first user in response to said second request to edit said shared electronic document; and
   only sending said electronic unlock request to said members of said unlock group in the event that said first user does not indicate that said first user is currently active during said inactivity time period following sending of said lock check message to said first user in response to said second request to edit said shared electronic document.

8. The method of claim 7, further comprising generating a user interface display object through which said second user can trigger said sending of said unlock requests to said members of said unlock group in the event that said first user does not indicate that said first user is currently active during said inactivity time period following sending of said lock check message to said first user in response to said second request to edit said shared electronic document.

9. The method of claim 5, further comprising automatically sending said first user a lock reminder message in response to detecting that said first user logs off without unlocking said shared electronic document.

10. The method of claim 1, wherein said unlock group includes at least one pre-defined user group.

11. The method of claim 10, wherein said pre-defined user group comprises a Lightweight Directory Access Protocol (LDAP) directory tree, and wherein said searching said unlock group includes searching said LDAP directory tree based on a user hierarchy indicated by said LDAP directory tree.

12. The method of claim 1, wherein said unlock request further indicates a change history of said shared electronic document.

13. A system, comprising:
   a shared document repository computer including at least one processor and at least one non-transitory computer readable medium for storing a currently locked shared document and program code for, when executed by said at least one processor, automatically identifying and notifying an appropriate user to unlock said currently locked shared electronic document by
   locking said electronic document in response to a first request to edit said shared electronic document, said first request from a first user,
   in response to said first request to edit said shared document, generating an unlock group definition user interface object through which said first user defines an unlock group and an unlock group hierarchy,
   wherein said unlock group includes a plurality of members, wherein each member in said unlock group is a user having access rights allowing them to unlock all of said electronic document when said electronic document is locked by another user;
   wherein said unlock group hierarchy defines an order in which said members of said unlock group are automatically contacted to unlock said electronic document;
   receiving, prior to said first user unlocking said shared electronic document, a second request to edit said shared electronic document, wherein said second request to edit said shared electronic document is received from a second user, and in response to said second request to edit said shared electronic document, sending unlock requests to individual members of said unlock group in said order defined by said unlock group hierarchy until one of said unlock group members unlocks said shared electronic document.

14. A computer program product including a computer readable memory, wherein said computer readable memory has program code stored thereon that, when executed, causes a computer to automatically identify and notify an appropriate user to unlock a currently locked shared electronic document in a computer system, comprising:

program code for locking said electronic document in response to a first request to edit said shared electronic document, said first request from a first user;

program code for, in response to said first request to edit said shared document, generating an unlock group definition user interface object through which said first user defines an unlock group and an unlock group hierarchy;

wherein said unlock group includes a plurality of members, wherein each member in said unlock group is a user having access rights allowing them to unlock all of said electronic document when said electronic document is locked by another user;

wherein said unlock group hierarchy defines an order in which said members of said unlock group are automatically contacted to unlock said electronic document;

program code for receiving, prior to said first user unlocking said shared electronic document, a second request to edit said shared electronic document, wherein said second request to edit said shared electronic document is received from a second user; and program code for, in response to said second request to edit said shared electronic document, sending unlock requests to individual members of said unlock group in said order defined by said unlock group hierarchy until one of said unlock group members unlocks said shared electronic document.

* * * * *